(12) United States Patent
Kirsch et al.

(10) Patent No.: US 12,130,099 B2
(45) Date of Patent: Oct. 29, 2024

(54) HEADER FOR HIGH-PRESSURE HEAT EXCHANGER

(71) Applicant: Hamilton Sundstrand Corporation, Charlotte, NC (US)

(72) Inventors: Kathryn L. Kirsch, Manchester, CT (US); Robert H. Dold, Monson, MA (US); Paul Attridge, Colchester, CT (US); Alexandru Cadar, Eastford, CT (US); Joseph Turney, Amston, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 28 days.

(21) Appl. No.: 17/959,399

(22) Filed: Oct. 4, 2022

(65) Prior Publication Data
US 2023/0116443 A1     Apr. 13, 2023

Related U.S. Application Data

(63) Continuation of application No. 17/499,352, filed on Oct. 12, 2021, now Pat. No. 11,493,286.

(51) Int. Cl.
*F28F 9/02* (2006.01)

(52) U.S. Cl.
CPC .... *F28F 9/0275* (2013.01); *F28F 2009/0287* (2013.01)

(58) Field of Classification Search
CPC ............ F28F 9/0275; F28F 2009/0287; F28F 9/0263; F28F 1/025; F28D 7/16

USPC ........................................................ 165/154
See application file for complete search history.

(56) References Cited

U.S. PATENT DOCUMENTS

| | | | |
|---|---|---|---|
| 9,134,072 B2 | 9/2015 | Roisin et al. | |
| 10,809,007 B2 | 10/2020 | Martinez et al. | |
| 10,830,543 B2 | 11/2020 | Schmitz et al. | |
| 10,941,992 B2 | 3/2021 | Mironets et al. | |
| 11,085,700 B2 | 8/2021 | Ranjan | |
| 11,209,222 B1 | 12/2021 | Colson | |
| 11,255,615 B2 * | 2/2022 | Streeter | F28F 9/0246 |

(Continued)

OTHER PUBLICATIONS

Extended European Search Report for EP Application No. 22190124.2, dated Feb. 7, 2023, 7 pages.

*Primary Examiner* — Jon T. Schermerhorn, Jr.
(74) *Attorney, Agent, or Firm* — Kinney & Lange, P.A.

(57) ABSTRACT

A header for a high-pressure heat exchanger includes a first high-pressure transition section with inlets for multiple first high-pressure flow channels that are spaced from one another in a radial direction and collectively arranged in a substantially circular shape. The inlets for the multiple first high-pressure flow channels on a radially outer edge of the first high-pressure transition section are spaced further apart in a circumferential direction from adjacent inlets of the multiple first high-pressure flow channels than radially inward inlets are spaced from adjacent radially inward inlets of the multiple first high-pressure flow channels. The header also includes multiple first high-pressure flow channels extending from the first high-pressure transition section to a second-high pressure transition section that is configured to divide each of the multiple first high-pressure flow channels into at least two first high-pressure sub-flow channels.

20 Claims, 4 Drawing Sheets

(56) References Cited

U.S. PATENT DOCUMENTS

| | | | |
|---|---|---|---|
| 11,268,770 B2 | 3/2022 | Ruiz et al. | |
| 11,274,886 B2 | 3/2022 | Becene et al. | |
| 11,359,864 B2 | 6/2022 | Becene et al. | |
| 11,396,069 B2 | 7/2022 | Norman | |
| 2014/0174703 A1* | 6/2014 | Yoshioka | F28F 1/022 |
| | | | 165/173 |
| 2017/0089643 A1 | 3/2017 | Arafat | |
| 2017/0205146 A1 | 7/2017 | Turney et al. | |
| 2017/0248372 A1* | 8/2017 | Erno | F28F 13/06 |
| 2018/0345425 A1* | 12/2018 | Caimano | B23P 15/26 |
| 2020/0041212 A1 | 2/2020 | Palmer et al. | |
| 2020/0217591 A1* | 7/2020 | Henderson | F28F 1/022 |
| 2020/0284532 A1 | 9/2020 | Becene et al. | |
| 2021/0071964 A1 | 3/2021 | Ruiz et al. | |
| 2021/0148655 A1 | 5/2021 | Clavette et al. | |
| 2021/0154779 A1 | 5/2021 | Norman | |
| 2021/0231381 A1 | 7/2021 | Horoszczak et al. | |

\* cited by examiner

HEADER FOR HIGH-PRESSURE HEAT EXCHANGER

CROSS-REFERENCE TO RELATED APPLICATION(S)

This application is a continuation of U.S. application Ser. No. 17/499,352 filed Oct. 12, 2021 for "HEADER FOR HIGH-PRESSURE HEAT EXCHANGER" by K. Kirsch, R. Dold, P. Attridge, A. Cadar, J. Turney, and R. Ranjan.

STATEMENT OF GOVERNMENT INTEREST

This invention was made with government support under Contract No. DE-AR0001121, awarded by United States Department of Energy. The government has certain rights in the invention.

FIELD OF THE INVENTION

The present invention relates to heat exchangers and, in particular, to headers for heat exchangers that contain and provide thermal energy transfer for high-pressure fluids.

BACKGROUND

Typical heat exchangers are designed to provide a configuration in which a hot fluid can transfer thermal energy to a cold fluid. Usually, the hot and cold fluids are low-pressure fluids (e.g., fluids that have a pressure less than approximately 65 bars (950 psi)). The heat exchanger, including the headers that direct the fluids into and out of the heat exchanger core, do not need to handle high pressures from the fluids. For example, the headers can include anywhere from tens to thousands of channels branching and merging to connect to a core that has tens to thousands of particularly shaped passages. Because the heat exchangers and the headers that direct the fluids into and out of the heat exchangers do not need to handle high-pressures from the fluids, intricate topologies can be used for the headers without the need for structural support of the header channels and also without the need for configurations that reduce stress and strain caused by the elevated pressure.

SUMMARY

A first header for a high-pressure heat exchanger includes a first high-pressure inlet configured to connect to a source of high-pressure fluid and through which the high-pressure fluid flows therethrough to enter the first header, a first high-pressure tube extending from the high-pressure inlet to a first high-pressure transition section, and the first high-pressure transition section configured to divide the high-pressure fluid from the first high-pressure tube into multiple first high-pressure flow channels extending in an axial direction. The first high-pressure transition section has inlets for the multiple first high-pressure flow channels that are spaced from one another in a radial direction and collectively arranged in a substantially circular shape. The inlets for the multiple first high-pressure flow channels on a radially outer edge of the first high-pressure transition section are spaced further apart in a circumferential direction from adjacent inlets of the multiple first high-pressure flow channels than are spaced from adjacent radially inward inlets of the multiple first high-pressure flow channels. The first header also includes multiple first high-pressure flow channels extending from the first high-pressure transition section to a second-high pressure transition section, and the second high-pressure transition section being adjacent a core of the heat exchanger and configured to divide each of the multiple first high-pressure flow channels into at least two first high-pressure sub-flow channels. The first high-pressure sub-flow channels are configured to connect to high-pressure flow passages of the core. Each flow channel of the multiple first high-pressure flow channels and each sub-flow channel of the first high-pressure sub-flow channels have a round cross-sectional shape. The first header also includes a low-pressure flow path configured to extend from the core to a component able to accept low-pressure fluid.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A header for a heat exchanger is disclosed herein that can accommodate at least one fluid that is under high pressure (greater than approximately 65 bars (950 psi)). This header can direct a high-pressure fluid (e.g. approximately 300 bars (4350 psi)) and a relatively low-pressure fluid (e.g. approximately 65 bars (950 psi)) into and/or out of the heat exchanger. The header can be a high-pressure inlet header with a high-pressure flow path inlet and a low-pressure flow path outlet. Analogously, a high-pressure outlet header with a high-pressure flow path outlet and a low-pressure flow path inlet can be mirrored in substantially the same configuration as the high-pressure inlet header. The following description is in regards to the high-pressure inlet header but also applies to the high-pressure outlet header (in a mirrored configuration).

The high-pressure inlet header includes a first high-pressure transition section extending in an axial direction (i.e., the direction of fluid flow) that transitions/divides the flow from a single high-pressure tube upstream to multiple high-pressure flow channels downstream. The first high-pressure transition section has inlets of the multiple high-pressure flow channels collectively arranged in a substantially circular shape. Outer inlets are spaced from one another in a radial direction with the outer inlets on a radially outer edge of the first high-pressure transition section being spaced further apart from adjacent outer inlets on the radially outer edge than radially inward inlets are spaced from adjacent radially inward inlets. Such a configuration of the spacing of inlets reduces stress concentrations on the first high-pressure transition section caused by the pressure of the high-pressure fluid and the flow of the high-pressure fluid.

The multiple high-pressure flow channels extend in the axial direction from the first high-pressure transition section to a second high-pressure transition section, which is adjacent a core of the heat exchanger. The second high-pressure transition section transitions/divides the flow from each flow channel of the multiple high-pressure flow channels into at least two, but up to sixteen, sub-flow channels that match high-pressure flow passages through the core. Along the high-pressure flow path (which includes the high-pressure tube, the first high-pressure transition section, the multiple high-pressure flow channels, the second high-pressure transition section, and the high-pressure sub-flow channels), the flow path has a round cross-sectional shape; such as a circle, oval, ellipse, etc.; to provide increased strength to handle the high pressures of the high-pressure fluid flowing therein.

The low-pressure flow path through the high-pressure inlet header can have a variety of configurations, including a low-pressure tube, a first low-pressure transition section, multiple low-pressure flow channels, a second low-pressure transition section, and low-pressure sub-flow channels that are similar in configuration to corresponding components of the high-pressure flow path.

The header described herein provides sufficient strength and stress distribution/reduction to accommodate a high-pressure fluid flowing therethrough and through the heat exchanger core. Additionally, the configuration of the first high-pressure transition section, multiple high pressure flow channels, and second high-pressure transition section are simpler and more economical to manufacture than the prior art headers that divide the flow multiple times along a large distance in the axial direction. The configurations of prior art headers could crack and/or leak when carrying high-pressure fluids, and thus would not be able to be used in a high-pressure environment. These and other advantages will be realized in the disclosure below.

Figure 1:
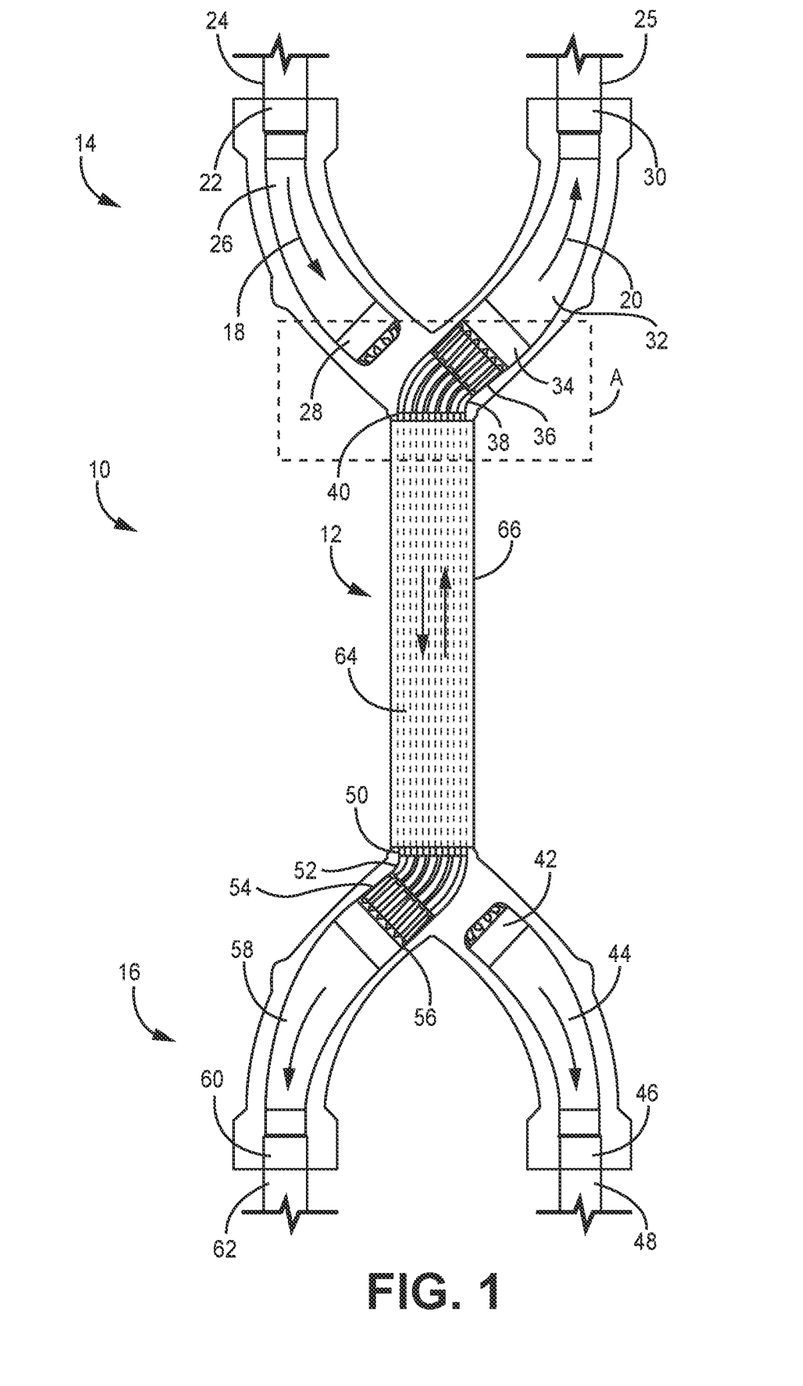
FIG. 1 is a cross-sectional view of a high-pressure heat exchanger.

FIG. 1 is a cross-sectional view of heat exchanger 10 having core 12, high-pressure inlet header 14, and high-pressure outlet header 16. Heat exchanger 10 also includes high-pressure flow path 18 and low-pressure flow path 20. Along high-pressure flow path 18, high-pressure inlet header 14 includes high-pressure inlet 22 (configured to connect to high-pressure fluid source 24), high-pressure tube 26, and first high-pressure transition section 28 (not shown in FIG. 1 are multiple high-pressure flow channels, second high-pressure transition section, and high-pressure sub-flow channels). Along low-pressure flow path 20, high-pressure inlet header 14 also includes low-pressure outlet 30 (configured to connect to low-pressure fluid component 25 that can accept low-pressure fluid), low-pressure tube 32, low-pressure transition section 34, multiple low-pressure flow channels 36, second low-pressure transition section 38, and low-pressure sub-flow channels 40.

High-pressure outlet header 16 is configured similarly to high-pressure inlet header 14. Along high-pressure flow path 18, high-pressure outlet header 16 includes (not shown in FIG. 1 but similar to the components of high-pressure inlet header 14) high-pressure sub-flow channels, a third high-pressure transition section, and multiple high-pressure flow channels. Also shown along high-pressure flow path 18, high-pressure outlet header 16 includes fourth high-pressure transition section 42, high-pressure tube 44, and high-pressure outlet 46 (configured to connect to high-pressure fluid component 48 that is able to accept high-pressure fluid). Along low-pressure flow path 20, high-pressure outlet header 16 also includes low-pressure sub-flow channels 50, third low-pressure transition section 52, multiple low-pressure flow channels 54, fourth low-pressure transition section 56, low-pressure tube 58, and low-pressure inlet 60 (configured to connect to low-pressure fluid source 62). Core 12 of heat exchanger 10 includes high-pressure flow passages 64 and low-pressure flow passages 66.

Heat exchanger 10 is disclosed herein having the low-pressure fluid enter heat exchanger 10 at a greater temperature than the high-pressure fluid enters heat exchanger 10. However, other configurations of heat exchanger 10 can have the high-pressure fluid entering heat exchanger 10 at a greater temperature than the low-pressure fluid enters heat exchanger 10. Additionally, heat exchanger 10 can include other features, characteristics, and/or configurations not expressly disclosed. Core 12 can have any configuration suitable for transferring thermal energy between the two fluids flowing through heat exchanger 10. For example, core 12 can have a generally rectangular cross-sectional shape. Core 12 can undulate (e.g., have waves) or extend straight in a flow direction, and high-pressure flow passages 64 and low-pressure flow passages 66 extending in opposite flow directions through core 12 can have any shape. In one embodiment, high-pressure flow passages 64 each have a circular cross-sectional shape and low-pressure flow passages 66 each have a substantially diamond cross-sectional shape situated between high-pressure flow passages 64.

High-pressure flow path 18 extends from high-pressure inlet 22 to high-pressure outlet 46 and conveys the high-pressure fluid from high-pressure fluid source 24 to high-pressure fluid component 48. Similarly, low-pressure flow path 20 extends in a generally opposite direction to high-pressure flow path 18 from low-pressure fluid source 62 to low-pressure fluid component 25. However, in other embodiments, high-pressure fluid flow path 18 can be in generally the same direction as low-pressure flow path 20.

High-pressure inlet header 14 is an upstream portion of high-pressure flow path 18 and a downstream portion of low-pressure flow path 20. As discussed above, high-pressure inlet header 14 has the same configuration as high-pressure outlet header 16 except that high-pressure outlet header 16 is mirrored in substantially the same configuration as high-pressure inlet header 14. Thus, any discussion below with regards to high-pressure inlet header 14 also applies to high-pressure outlet header 16 except that any inlets for high-pressure inlet header 14 are outlets for high-pressure outlet header 16 and vice versa.

High-pressure inlet header 14 includes a high-pressure side and a low-pressure side. High-pressure tube 26 receives high-pressure fluid from high-pressure fluid source 24 through high-pressure inlet 22. High-pressure tube 26 can have any size, shape, and/or configuration suitable for conveying high-pressure fluid from high-pressure fluid source 24 to first high-pressure transition section 28. In one embodiment, high-pressure tube 26 is a single channel having a circular cross-sectional shape. High-pressure tube 26 can extend straight or can have a curve, turn, or another configuration that changes the direction of the flow. In FIG.

1, high-pressure tube 26 has a curve of approximately forty-five degrees measured from a flow direction through core 12. High-pressure tube 26 can have a constant cross-sectional shape/area or can have a varying cross-sectional shape/area with stair steps or other features. Low-pressure tube 32 of high-pressure inlet header 14 and high-pressure tube 44 and low-pressure tube 58 of high-pressure outlet header 16 can each have similar shapes, sizes, and/or configurations of high-pressure tube 26 of high-pressure inlet header 14. For example, the curve of low-pressure tube 26 can have a curve of approximately forty-five degrees measured from a flow direction through core 12 such that the total difference in flow direction of high-pressure fluid in high-pressure tube 26 near first high-pressure transition section 28 and low-pressure fluid in low-pressure tube 32 near first low-pressure transition section 34 is approximately ninety degrees. A similar configuration can be present in high-pressure outlet header 16.

For clarity, FIG. 1 does not show the entirety of high-pressure flow path 18, and only shows high-pressure tubes 26 and 44 connected to first high-pressure transition section 28 and fourth high-pressure transition section 42, respectively. Other components of high-pressure flow path 18; such as the multiple high-pressure flow channels, the second high-pressure transition section, and the high-pressure sub-flow channels; are shown in FIGS. 2B-2E and described below. However, FIG. 1 does show high-pressure tube 26 connected to first high-pressure transition section 28 to transition/divide high-pressure fluid from a single channel to the multiple high-pressure flow channels. Similarly, high-pressure tube 44 is connected to fourth high-pressure transition section 42 to transition/merge high-pressure fluid from the multiple high-pressure flow channels in high-pressure outlet header 16 to a single channel of high-pressure tube 44.

FIG. 1 shows the entirety of low-pressure flow path 20 extending between low-pressure fluid source 62 (connected to high-pressure outlet heater 16) and low-pressure fluid component 25 (connected to high-pressure inlet header 14). Low-pressure flow path 20 can be similar in configuration and components to high-pressure flow path 18 but in an opposite direction. Low-pressure fluid enters heat exchanger 10 through low-pressure inlet 60, through which low-pressure fluid flows into low-pressure tube 58 of high-pressure outlet header 16. Low-pressure tube 58 can have the same shape, size, and/or configuration as high-pressure tubes 26 and 44 or can differ. Low-pressure fluid then flows from low-pressure tube 58 into fourth low-pressure transition section 56, which transitions/divides the low-pressure fluid into multiple low-pressure flow channels 54. Multiple low-pressure flow channels 54 extend substantially parallel to one another from fourth low-pressure transition section 56 to third low-pressure transition section 52. Multiple low-pressure flow channels 54 can extend straight or can curve, turn, or otherwise change direction. As shown in FIG. 1, multiple low-pressure flow channels 54 (and 36) curve to change the direction of low-pressure fluid flow approximately forty-five degrees.

At third low-pressure transition section 52, the low-pressure fluid is transitioned/divided again into at least two low-pressure sub-flow channels 50 for each flow channel of the multiple low-pressure flow channels 54. In some embodiments, each flow channel of the multiple low-pressure flow channels 54 are divided at third low-pressure transition section 52 into more than two low-pressure sub-flow channels 50, such as four, six, nine, or sixteen sub-flow channels. Additionally, adjacent flow channels of the multiple low-pressure flow channels 54 within third low-pressure transition section 52 can divide the flow into a different number of low-pressure sub-flow channels 50. Also, third low-pressure transition section 52 can transition the shape of each flow channel from, for example, a circular cross-sectional shape of multiple low-pressure flow channels 54 to a diamond cross-sectional shape of low-pressure sub-flow channels 50. After being divided at third low-pressure transition section 52, the low-pressure fluid flows through low-pressure sub-flow channels 50 into core 12.

After exiting core 12, the low-pressure fluid flows through high-pressure inlet header 14 in a similar manner as high-pressure outlet header 16 but in an opposite direction. Thus, the low-pressure fluid flows into low-pressure sub-flow channels 40 and then is merged into multiple low-pressure flow channels 36 by second low-pressure transition section 38. Multiple low-pressure flow channels 36 then extend (and possibly curve the low-pressure fluid flow) to first low-pressure transition section 34, which transitions/merges the low-pressure fluid into one single channel of low-pressure tube 32. Low-pressure tube 32 connects to low-pressure fluid component 25, allowing the low-pressure fluid to flow out of heat exchanger 10 either at an elevated temperature than when low-pressure fluid entered heat exchanger 10 or at a lower temperature than when low-pressure fluid entered heat exchanger 10, depending on the design and thermal energy transfer needs of heat exchanger 10.

As shown in FIG. 1, high-pressure flow path 18 and low-pressure flow path 20 are distant from one another at high-pressure inlet 22 and low-pressure outlet 30 (in high-pressure inlet header 14) and at high-pressure outlet 46 and low-pressure inlet 60 (in high-pressure outlet header 16) due to the curves in high-pressure tubes 26 and 44, low-pressure tubes 32 and 58, the multiple high-pressure flow channels, and multiple low-pressure flow channels 36 and 54. However, heat exchanger 10 can have other configurations not expressly disclosed herein. For example, headers 14 and 16 can have other degrees of curves/turns or can be straight. Additionally, the high-pressure side and low-pressure sides of headers 14 and 16 do not need to extend away from each other such that high-pressure inlet 22 and low-pressure outlet 30 (and low-pressure inlet 60 and high-pressure outlet 46) can be adjacent to one another.

Figure 2A:
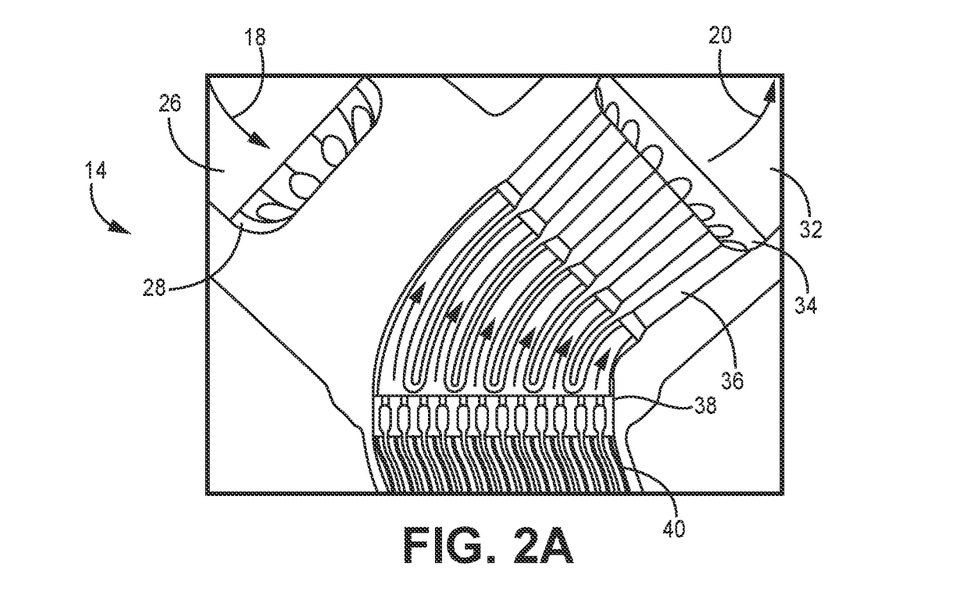
FIG. 2A is a cross-sectional view of a portion of a high-pressure inlet header showing a portion of a low-pressure flow path as set out by box A in FIG. 1.
Figure 2B:
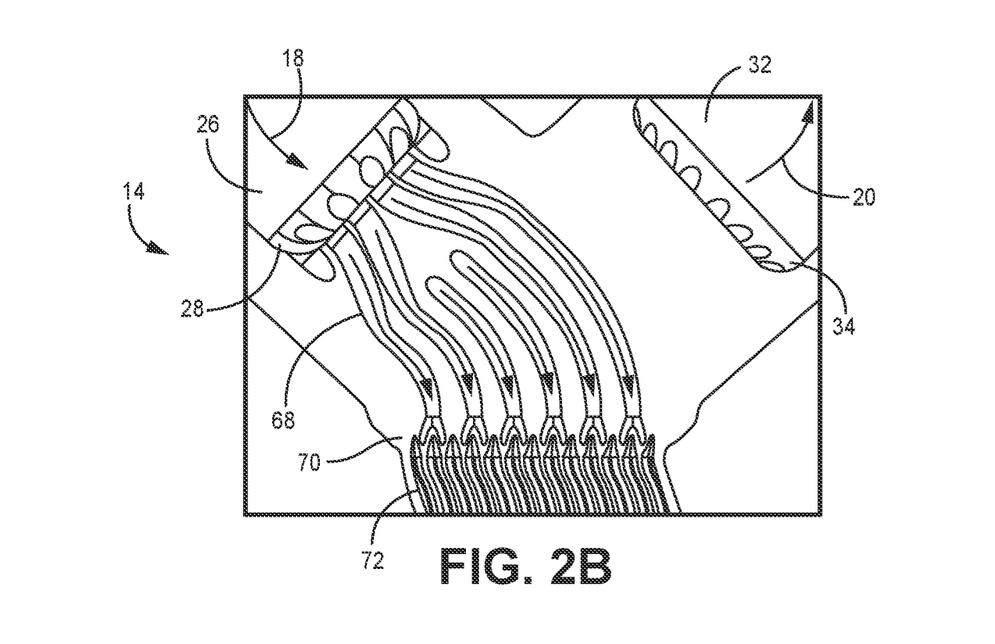
FIG. 2B is a cross-sectional view of the portion of the high-pressure inlet header in FIG. 2A showing a portion of a high-pressure flow path as set out by box A in FIG. 1.
Figure 2C:
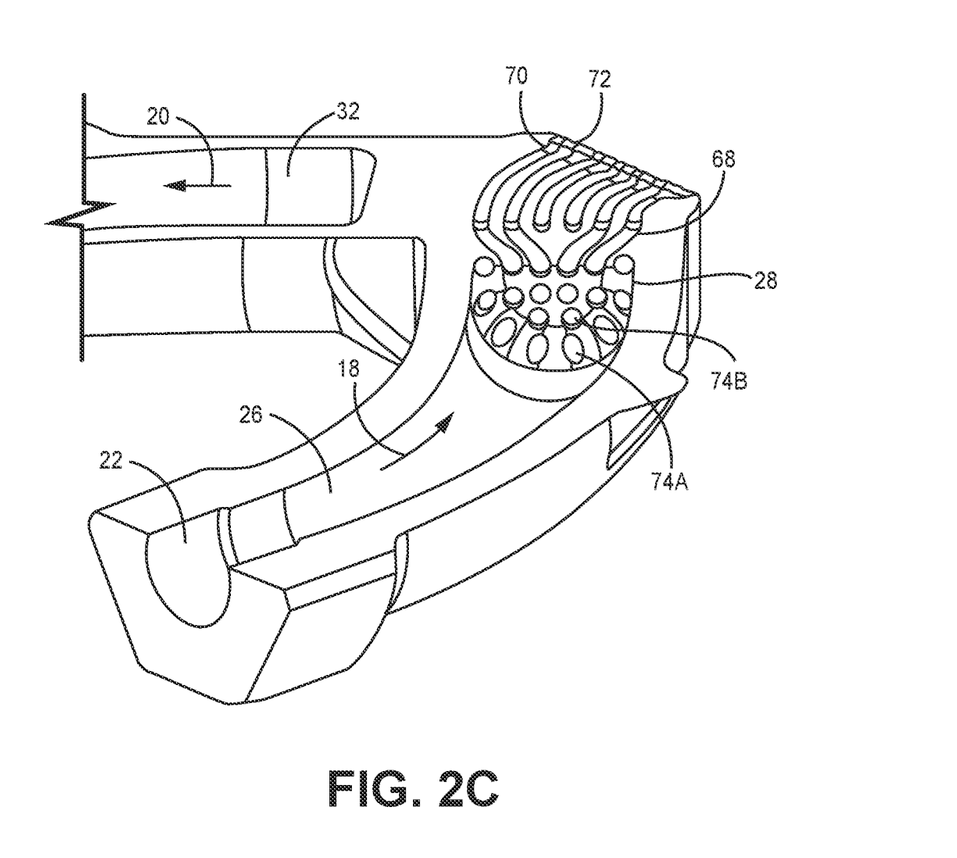
FIG. 2C is a partial perspective view of a portion of the high-pressure inlet header in FIG. 2A.
Figure 2D:
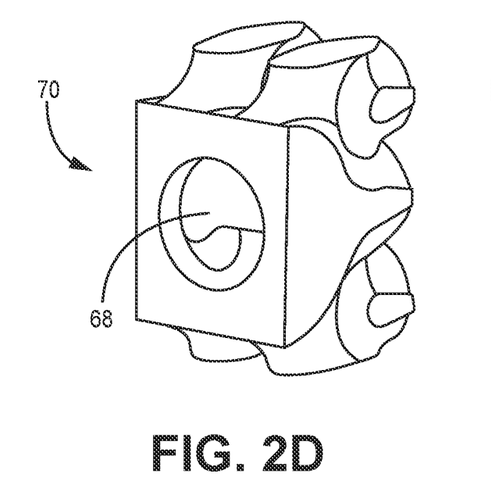
FIG. 2D is a partial perspective view of an inlet side of one embodiment of the second high-pressure transition section.
Figure 2E:
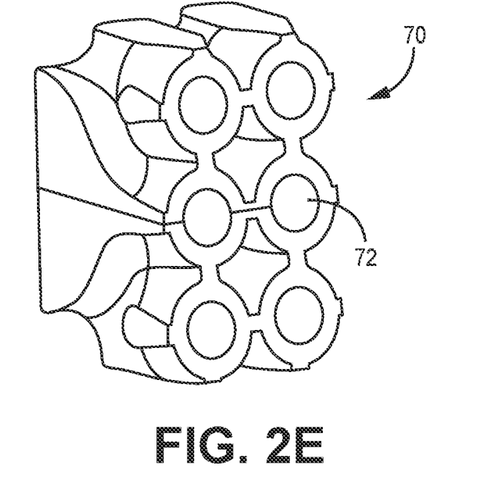
FIG. 2E is a partial perspective view of an outlet side of one embodiment of the second high-pressure transition section.

FIG. 2A is a cross-sectional view of a portion of high-pressure inlet header 14 showing low-pressure flow path 20 as set out by box A in FIG. 1, FIG. 2B is a cross-sectional view of a portion of high-pressure inlet header 14 showing the multiple high-pressure flow channels, FIG. 2C is a different cross-sectional view of a portion of high-pressure inlet header, and FIGS. 2D and 2E are cross-sectional views of a portion of a second high-pressure transition section.

Shown in FIGS. 2A-2E is high-pressure inlet header 14 having high-pressure flow path 18 with high-pressure inlet 22, high-pressure tube 26, first high-pressure transition section 28, multiple high-pressure flow channels 68, second high-pressure transition section 70, and high-pressure sub-flow channels 72. Additionally, high-pressure inlet header 14 has low-pressure flow path 20 with low-pressure outlet 30 (not shown), low-pressure tube 32, first low-pressure transition section 34, multiple low-pressure flow channels 36, second low-pressure transition section 38, and low-pressure sub-flow channels 40. While FIGS. 2A-2E show high-pressure inlet header 14, high-pressure outlet header 16 can have the same components, sizes, configurations, etc., except that high-pressure outlet header 16 has a mirrored configuration than that of high-pressure inlet header 14 and provides an inlet for low-pressure fluid and an outlet for high-pressure fluid.

FIG. 2A shows an enlarged cross-sectional view of a portion of low-pressure tube 32 and each of first low-pressure transition section 34, multiple low-pressure flow channels 36, second low-pressure transition section 38, and low-pressure sub-flow channels 40. Low-pressure passages 66 of core 12 (not shown) each connect to one low-pressure sub-flow channel 40. At second low-pressure transition section 38, low-pressure sub-flow channels 40 converge into multiple low-pressure flow channels 36. Also at second low-pressure transition section 38, the cross-sectional shape of the flow/sub-flow channels can change, for example, from a diamond cross-sectional shape of low-pressure sub-flow channels 40 to a circular cross-sectional shape of multiple low-pressure flow channels 36.

Multiple low-pressure flow channels 36 can extend substantially parallel and, as shown in FIG. 2A, curve to change the direction of multiple low-pressure flow channels 36 approximately forty-five degrees between second low-pressure transition section 38 and first low-pressure transition section 34. At first low-pressure transition section 34, multiple low-pressure flow channels 36 converge into one single low-pressure tube 32. First low-pressure transition section 34 can have a circular cross-sectional shape similar to first high-pressure transition section 28 or can have another configuration suitable for converging multiple low-pressure flow channels 36 into one single low-pressure tube 32.

FIGS. 2B and 2C show a portion of high-pressure flow path 18 with high-pressure tube 26, first high-pressure transition section 28, multiple high-pressure flow channels 68, second high-pressure transition section 70, and high-pressure sub-flow channels 72. High-pressure tube 26 has a circular cross-sectional shape and extends from high-pressure inlet 22 to first high-pressure transition section 28. High-pressure tube 26 can extend straight or curve, turn, or otherwise change direction. In the disclosed embodiment, high-pressure tube 26 curves approximately forty-five degrees.

High-pressure tube 26 connects to first high-pressure transition section 28, which divides the high-pressure fluid flow from a single, circular flow into multiple high-pressure flow channels 68 extending in an axial direction. First high-pressure transition section 28 has multiple inlets for multiple high-pressure flow channels 68 spaced from other inlets in a radial direction to collectively arrange the multiple inlets in a substantially circular shape. The inlets of multiple high-pressure flow channels 68 are arranged into outer inlets 74A on a radially outer edge of first high-pressure transition section 28 and inner inlets 74B radially inward from outer inlets 74A. Outer inlets 74A are spaced further apart from adjacent outer inlets 74A than inner inlets 74B are spaced from adjacent inner inlets 74B. Such a configuration of spacing of outer inlets 74A and inner inlets 74B reduces stress concentrations on first high-pressure transition section 28 caused by the elevated pressure of the high-pressure fluid. First high-pressure transition section 28, as shown in FIG. 2C, has a semi-ellipsoidal shape in the flow direction (i.e., the axial direction) such that outer inlets 74A are tapered in the radial direction and inner inlets 74B can be tapered or are flat in a radial direction. Such a configuration also reduces stress concentrations.

Multiple high-pressure flow channels 68 extend from first high-pressure transition section 28 to second high-pressure transition section 70. Multiple high-pressure flow channels 68 can extend substantially parallel and, as shown in FIG. 2B, curve to change the direction of multiple high-pressure flow channels 68 approximately forty-five degrees between first high-pressure transition section 28 and second high-pressure transition section 70. Each flow channel of the multiple high-pressure flow channels 68 can have a variety of cross-sectional shapes, including a round cross-sectionals shape, such as a circle, oval, ellipse, etc. In one embodiment, each flow channel of the multiple high-pressure flow channels 68 are independent from one another and do not converge or diverge between first high-pressure transition section 28 and second high-pressure transition section 70 (i.e., the number of multiple high-pressure flow channels 68 remains constant). Another embodiment, shown and discussed with regards to FIG. 3 below, can include multiple high-pressure flow channels 68 that converge and then diverge again between first high-pressure transition section 28 and second high-pressure transition section 70. Each flow channel of the multiple high-pressure flow channels 68 can have different sizes, shapes, and/or configurations from adjacent flow channels.

Multiple high-pressure flow channels 68 extend to second high-pressure transition section 70, where each flow channel diverges into high-pressure sub-flow channels 72. FIG. 2D shows one of the multiple high-pressure flow channels 68 extending to second high-pressure transition section 70, and FIG. 2E shows high-pressure sub-flow channels 72 that have diverged from the one flow channel shown in FIG. 2D. As shown in the embodiment of FIGS. 2D and 2E, second high-pressure transition section 70 divides the flow of each of the multiple high-pressure flow channels 68 horizontally and vertically to form six sub-flow channels per flow channel. These channels/sub-flow channels can continue to have a substantially circular cross-sectional shape through second high-pressure transition section 70. While shown as diverging into six sub-flow channels, second high-pressure transition section 70 can divide the flow of each flow channel of the multiple high-pressure flow channels 68 into any number of high-pressure sub-flow channels 72, such as two, four, nine, and sixteen sub-flow channels. Additionally, adjacent flow channels can be divided by second high-pressure transition section 70 into different numbers of sub-flow channels. High-pressure sub-flow channels 72 connect to core 12 and correspond to each passage of the high-pressure passages 64.

High-pressure inlet header 14 can be constructed such that multiple high-pressure flow channels 68, second high-pressure transition section 70, high-pressure sub-flow channels 72, multiple low-pressure flow channels 36, second low-pressure transition section 38, and low-pressure sub-flow channels 40 are all one continuous and monolithic piece contained in a solid block of material. This configuration may be accomplished by constructed high-pressure inlet header 14 via additive manufacturing and/or constructing the entirety of heat exchanger 10 via additive manufacturing.

Figure 3:
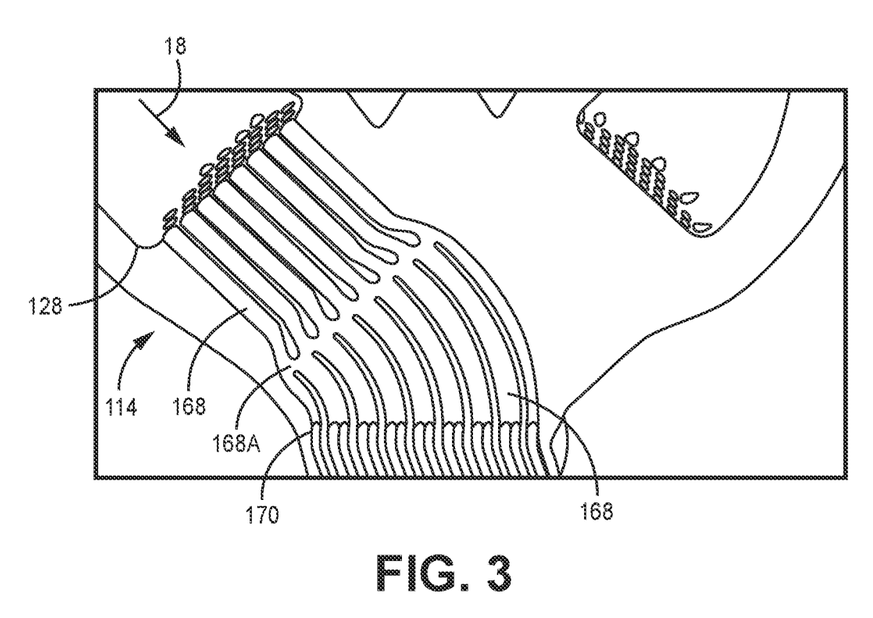
FIG. 3 is a cross-sectional view of one embodiment of the multiple high-pressure flow channels.

FIG. 3 is a cross-sectional view of a portion of one embodiment of high-pressure inlet header 114 showing multiple high-pressure flow channels 168 converging and diverging between first high-pressure transition section 128 and second high-pressure transition section 170. To reduce stress concentrations in high-pressure inlet header 114, it may be advantageous for multiple high-pressure flow channels 168 to converge at junction 168A and then diverge again before second high-pressure transition section 170. The number of flow channels of high-pressure flow channels 168 downstream of junction 168A (after diverging) can be the same number as before junction 168A (before converging), can be fewer flow channels than before junction 168A, or (as shown in FIG. 3), can be more flow channels than before junction 168A. The cross-sectional shape of each flow channel of the multiple high-pressure flow channels 168 can be constant or can vary, such as being constricted before junction 168A and enlarged after junction 168A.

Heat exchanger 10 can include other components, features, characteristics, and/or configurations not expressly disclosed herein. Additionally, core 12 and headers 14/114 and 16 can have a variety of other configurations and features suitable for handling the elevated pressures of the high-pressure fluid while adequately transferring thermal energy between the high-pressure fluid and the low-pressure fluid.

Headers 14 and 16 described herein provide sufficient strength and stress distribution/reduction to accommodate a high-pressure fluid flowing therethrough and through heat exchanger 10. Additionally, the configurations of first high-pressure transition section 28, multiple high pressure flow channel 68, and second high-pressure transition section 70 are simpler and more economical to manufacture than prior art headers that divide flow multiple times across multiple stages distributed along a large distance in the axial/flow direction. The configurations of prior art headers cannot reliably accommodate high-pressure fluids (the prior art headers would crack and leak), and thus would not be able to be used in a high-pressure environment.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A first header for a high-pressure heat exchanger includes a first high-pressure inlet configured to connect to a source of high-pressure fluid and through which the high-pressure fluid flows therethrough to enter the first header, a first high-pressure tube extending from the high-pressure inlet to a first high-pressure transition section, and the first high-pressure transition section configured to divide the high-pressure fluid from the first high-pressure tube into multiple first high-pressure flow channels extending in an axial direction. The first high-pressure transition section has inlets for the multiple first high-pressure flow channels that are spaced from one another in a radial direction and collectively arranged in a substantially circular shape. The inlets for the multiple first high-pressure flow channels on a radially outer edge of the first high-pressure transition section are spaced further apart in a circumferential direction from adjacent inlets of the multiple first high-pressure flow channels than radially inward inlets are spaced from adjacent radially inward inlets of the multiple first high-pressure flow channels. The first header also includes multiple first high-pressure flow channels extending from the first high-pressure transition section to a second-high pressure transition section, and the second high-pressure transition section being adjacent a core of the heat exchanger and configured to divide each of the multiple first high-pressure flow channels into at least two first high-pressure sub-flow channels. The first high-pressure sub-flow channels are configured to connect to high-pressure flow passages of the core. Each flow channel of the multiple first high-pressure flow channels and each sub-flow channel of the first high-pressure sub-flow channels have a round cross-sectional shape. The first header also includes a low-pressure flow path configured to extend from the core to a component able to accept low-pressure fluid.

The header of the preceding paragraph can optionally include, additionally and/or alternatively, any one or more of the following features, configurations, and/or additional components:

The low-pressure flow path includes a low-pressure outlet configured to connect to the component able to accept low-pressure fluid, a low-pressure tube extending from a first low-pressure transition section to the low-pressure outlet, the first low-pressure transition section configured to merge the low-pressure fluid from multiple low-pressure flow channels into the low-pressure tube, the multiple low-pressure flow channels extending from a second low-pressure transition section to the first low-pressure transition section, the second low-pressure transition section being adjacent the core and configured to merge at least two low-pressure sub-flow channels into each of the multiple low-pressure flow channels, and the low-pressure sub-flow channels being configured to connect to low-pressure flow passages of the core.

Each of the low-pressure sub-flow channels has a substantially diamond cross-sectional shape.

The number of multiple low-pressure flow channels remains constant between the second low-pressure transition section and the first low-pressure transition section.

The multiple first high-pressure flow channels, second high-pressure transition section, the first high-pressure sub-flow channels, the multiple low-pressure flow channels, the second low-pressure transition section, and the low-pressure sub-flow channels are all in a solid block.

The low-pressure flow path changes direction forty-five degrees or less between the second low-pressure transition section and the first low-pressure transition section.

The high-pressure fluid is at a pressure greater than approximately 300 bars (4350 psi).

The low-pressure fluid is at a pressure greater than approximately 65 bars (950 psi).

The round cross-sectional shape of each of the multiple first high-pressure flow channels and each of the first high-pressure sub-flow channels are circular.

The multiple first high-pressure flow channels converge and then diverge between the first high-pressure transition section and the second high-pressure transition section.

The multiple first high-pressure flow channels change direction forty-five degrees or less between the first high-pressure transition section and the second high-pressure transition section.

The first high-pressure transition section is semi-ellipsoidal in a flow direction of the high-pressure fluid.

The second high-pressure transition section is configured to divide each of the multiple first high-pressure flow channels into six first high-pressure sub-flow channels.

The first high-pressure tube has a substantially circular cross-sectional shape.

A heat exchanger that includes the core having high-pressure flow passages and low-pressure flow passages and the first header connected to the core.

The high-pressure flow passages have a substantially circular cross-sectional shape.

A second header configured to extend from the core to a component able to accept high-pressure fluid that includes a third high-pressure transition section adjacent to the core and configured to merge at least two second high-pressure sub-flow channels, which are configured to connect to high-pressure flow passages of the core, into one of multiple second high-pressure flow channels; the multiple second high-pressure flow channels extend between the third high-pressure transition section and a fourth high-pressure transition section; the fourth high-pressure transition section configured to merge the multiple second high-pressure flow channels extending in the axial direction into a second high-pressure tube, the fourth high-pressure transition section having outlets of the multiple second high-pressure flow channels spaced from one another in a radial direction and collectively arranged in a substantially circular shape, the outlets of the multiple second high-pressure flow channels on a radially outer edge of the fourth high-pressure transition section being spaced further apart in the circumferential direction from adjacent outlets of the multiple second high-pressure flow channels than radially inward outlets are spaced from adjacent radially inward outlets of the multiple second high-pressure flow channels; a second high-pressure tube extending from the fourth high-pressure transition section to a high-pressure outlet; the high-pressure outlet configured to connect to the component able to accept high-pressure fluid, wherein each of the second high-pressure flow channels and each of the second high-pressure sub-flow channels have a round cross-sectional shape.

The second header further includes a second low-pressure flow path configured to extend from a source of low-pressure fluid to the core.

The first header, the core, and the second header are one continuous and monolithic component constructed via additive manufacturing.

The first high-pressure tube changes direction forty-five degrees or less between the first high-pressure inlet and the first high-pressure transition section.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A first header for a high-pressure heat exchanger, the header comprising:
   a first high-pressure inlet configured to connect to a source of high-pressure fluid and through which the high-pressure fluid flows therethrough to enter the first header;
   a first high-pressure tube extending from the high-pressure inlet to a first high-pressure transition section;
   the first high-pressure transition section configured to divide the high-pressure fluid from the first high-pressure tube into multiple first high-pressure flow channels extending in an axial direction, the first high-pressure transition section having inlets of the multiple first high-pressure flow channels spaced from one another in a radial direction and collectively arranged in a substantially circular shape, the inlets of the multiple first high-pressure flow channels on a radially outer edge of the first high-pressure transition section being spaced further apart in a circumferential direction from adjacent inlets of the multiple first high-pressure flow channels than radially inward inlets are spaced from adjacent radially inward inlets of the multiple first high-pressure flow channels;
   the multiple first high-pressure flow channels extending from the first high-pressure transition section to a second-high pressure transition section;
   the second high-pressure transition section being adjacent a core of the heat exchanger and configured to divide each of the multiple first high-pressure flow channels into at least two first high-pressure sub-flow channels, the first high-pressure sub-flow channels being configured to connect to high-pressure flow passages of the core;
   a low-pressure outlet configured to connect to a component able to accept low-pressure fluid;
   a low-pressure tube extending from a first low-pressure transition section to the low-pressure outlet;
   the first low-pressure transition section configured to merge the low-pressure fluid from multiple low-pressure flow channels into the low-pressure tube;
   the second low-pressure transition section being adjacent the core and configured to merge at least two low-pressure sub-flow channels into each of the multiple low-pressure flow channels; and
   the low-pressure sub-flow channels being configured to connect to low-pressure flow passages of the core.

2. The first header of claim 1, wherein each flow channel of the first high-pressure flow channels and each sub-flow channel of the first high-pressure sub-flow channels have a round cross-sectional shape.

3. The first header of claim 1, wherein each of the low-pressure sub-flow channels has a substantially diamond cross-sectional shape.

4. The first header of claim 2, wherein the number of multiple low-pressure flow channels remains constant between the second low-pressure transition section and the first low-pressure transition section.

5. The first header of claim 2, wherein the multiple first high-pressure flow channels, second high-pressure transition section, the first high-pressure sub-flow channels, the multiple low-pressure flow channels, the second low-pressure transition section, and the low-pressure sub-flow channels are all in a solid block.

6. The first header of claim 1, wherein the low-pressure flow path changes direction forty-five degrees or less between the second low-pressure transition section and the first low-pressure transition section.

7. The first header of claim 1, wherein the high-pressure fluid is at a pressure greater than approximately 300 bars (4350 psi).

8. The first header of claim 1, wherein the low-pressure fluid is at a pressure greater than approximately 65 bars (950 psi).

9. The first header of claim 1, wherein the round cross-sectional shape of each of the multiple first high-pressure flow channels and each of the first high-pressure sub-flow channels are circular.

10. The first header of claim 1, wherein the multiple first high-pressure flow channels converge and then diverge between the first high-pressure transition section and the second high-pressure transition section.

11. The first header of claim 1, wherein the multiple first high-pressure flow channels change direction forty-five degrees or less between the first high-pressure transition section and the second high-pressure transition section.

12. The first header of claim 1, wherein the first high-pressure transition section is semi-ellipsoidal in a flow direction of the high-pressure fluid.

13. The first header of claim 1, wherein the second high-pressure transition section is configured to divide each of the multiple first high-pressure flow channels into six first high-pressure sub-flow channels.

14. The first header of claim 1, wherein the first high-pressure tube has a substantially circular cross-sectional shape.

15. A heat exchanger comprising:
the core having high-pressure flow passages and low-pressure flow passages; and
the first header of claim 1 connected to the core.

16. The heat exchanger of claim 15, wherein the high-pressure flow passages have a substantially circular cross-sectional shape.

17. The heat exchanger of claim 15, further comprising:
a second header configured to extend from the core to a component able to accept high-pressure fluid, the second header comprising:
a third high-pressure transition section adjacent to the core and configured to merge at least two second high-pressure sub-flow channels, which are configured to connect to high-pressure flow passages of the core, into one of multiple second high-pressure flow channels;
the multiple second high-pressure flow channels extend between the third high-pressure transition section and a fourth high-pressure transition section;
the fourth high-pressure transition section configured to merge the multiple second high-pressure flow channels extending in the axial direction into a second high-pressure tube, the fourth high-pressure transition section having outlets of the multiple second high-pressure flow channels spaced from one another in a radial direction and collectively arranged in a substantially circular shape, the outlets of the multiple second high-pressure flow channels on a radially outer edge of the fourth high-pressure transition section being spaced further apart in the circumferential direction from adjacent outlets of the multiple second high-pressure flow channels than radially inward outlets are spaced from adjacent radially inward outlets of the multiple second high-pressure flow channels;
a second high-pressure tube extending from the fourth high-pressure transition section to a high-pressure outlet;
the high-pressure outlet configured to connect to the component able to accept high-pressure fluid,
wherein each of the second high-pressure flow channels and each of the second high-pressure sub-flow channels have a round cross-sectional shape.

18. The heat exchanger of claim 17, wherein the second header further comprises:
a second low-pressure flow path configured to extend from a source of low-pressure fluid to the core.

19. The heat exchanger of claim 17, wherein the first header, the core, and the second header are one continuous and monolithic component constructed via additive manufacturing.

20. The first header of claim 1, wherein the first high-pressure tube changes direction forty-five degrees or less between the first high-pressure inlet and the first high-pressure transition section.

\* \* \* \* \*